Figure 1:
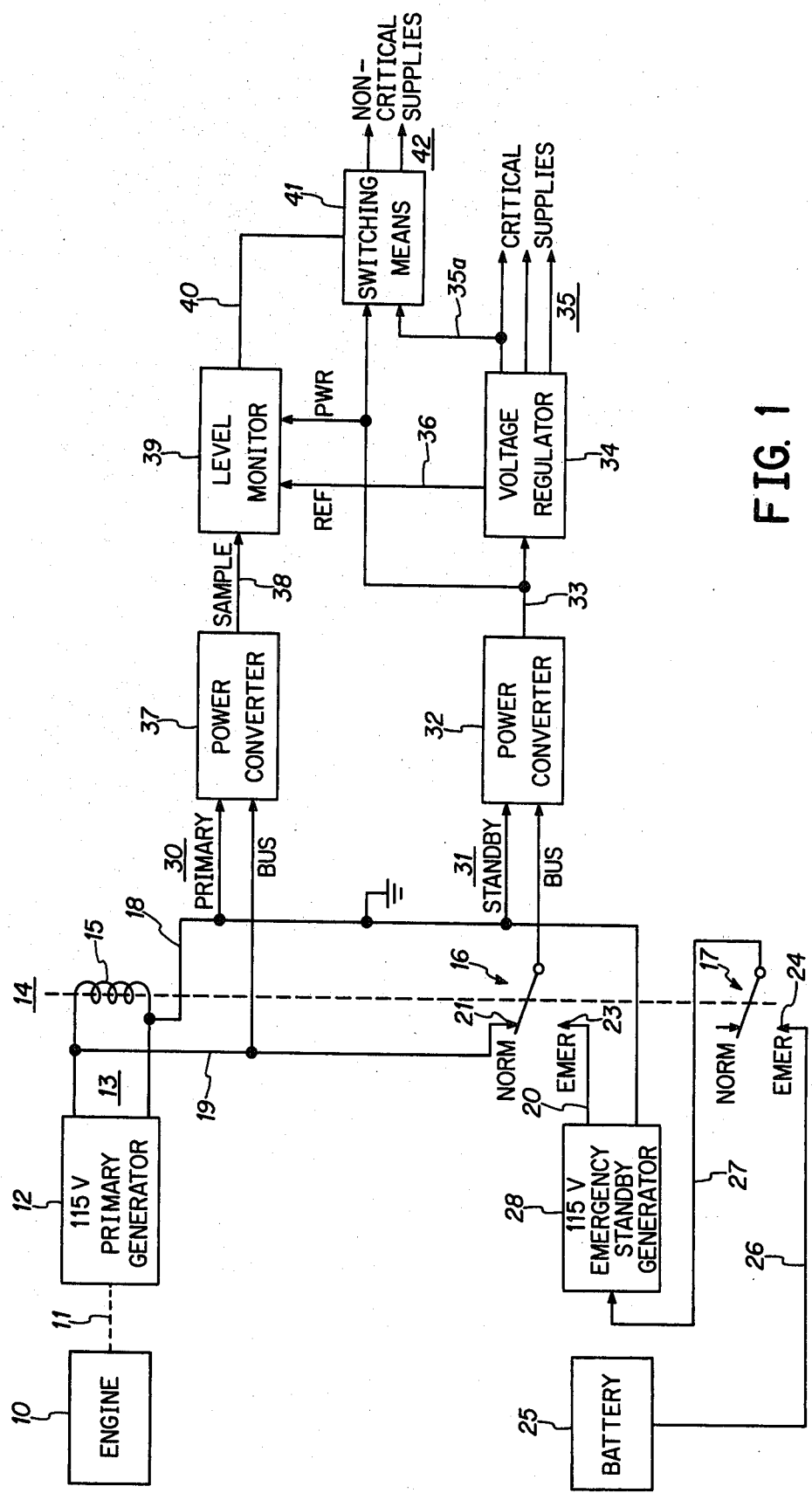

United States Patent [19]

Lacy

[11] 4,400,626
[45] Aug. 23, 1983

[54] POWER DISTRIBUTION SYSTEM WITH MEANS FOR SENSING EMERGENCY CONDITION AND REDUCING STANDBY POWER

[75] Inventor: Larry D. Lacy, Walker, Iowa

[73] Assignee: Rockwell International Corporation, El Segundo, Calif.

[21] Appl. No.: 351,724

[22] Filed: Feb. 24, 1982

[51] Int. Cl.³ ............................................... H02J 7/00
[52] U.S. Cl. ..................................................... 307/66
[58] Field of Search ....................... 307/23, 39, 62, 66, 307/82, 84, 18, 19, 64, 67, 68

[56] References Cited

U.S. PATENT DOCUMENTS

| | | | |
|---|---|---|---|
| 3,778,634 | 12/1973 | Hanrihan | 307/64 |
| 4,099,692 | 7/1978 | Kolkman | 307/64 X |
| 4,216,384 | 8/1980 | Hurley | 307/39 |
| 4,349,148 | 9/1982 | Liberto et al. | 307/66 X |
| 4,356,402 | 10/1982 | Morimoto et al. | 307/23 X |

Primary Examiner—L. T. Hix
Assistant Examiner—Derek Jennings
Attorney, Agent, or Firm—Richard W. Anderson; Howard R. Greenberg; H. Fredrick Hamann

[57] ABSTRACT

A power generating and distribution system employs primary and emergency back-up standby generators with the primary generator normally powering a conversion supply from which critical supplies are directly connected to a user system and non-critical supplies are selectively connected to the user system through electronic switching devices. The switching means are activated by a monitor control which compares a sample of the primary generator voltage level with a reference level of the generator output powering the conversion supply and generates a control signal to close the electronic switching devices only when the monitor sample exceeds the monitor reference.

3 Claims, 2 Drawing Figures

POWER DISTRIBUTION SYSTEM WITH MEANS FOR SENSING EMERGENCY CONDITION AND REDUCING STANDBY POWER

This invention relates generally to power distribution systems of the type providing emergency standby facilities, and more particularly to a power distribution system with standby power facilities which provides a means of retaining user system functions which are critical under emergency conditions, while reducing the power consumption during emergency conditions, thus prolonging the usefulness of the emergency backup system.

The present invention will be described in the environment of a power supply system utilized with a flight control system in an aircraft, however it is not to be limited thereto since the distribution concept to be described would be equally applicable in other environments wherein a primary source of power is utilized with a user system and provision is made for a backup system such as a battery driven standby power generating capability.

Aircraft automatic flight control systems, such as the current state of the art digital systems employing computerized processors in the design and employing a computation redundancy in the interest of safety, often give rise to the definition of critical and non-critical power requirements. Under normal operating conditions when a primary power generating source is fully operational, the prior art has utilized separate dedicated power supplies with a first power supply powered from the primary bus connected to the primary power generating means and a second power supply powered from a standby (critical) power bus. Each power supply sourced its dedicated functions, such that loss of the primary bus powered-down that supply and all non-critical functions in the user system, leaving the standby bus with its dedicated supply to provide critical function power. For example, in a typical flight control system, a first dedicated power supply provided the captain's flight control processor and display with non-critical power. A second completely dedicated standby power supply provided critical power supplies to the captain's processor and display system. The standby system, being generally a battery driven generator which might be automatically or manually switched in, provided only primary critical power for the captain's system, such that flight control necessary to the continuation of the flight would be maintained while conserving the limited power available from the battery powered standby system.

It has been found that prior art systems of the abovedescribed type required the inefficient utilization of power conversion circuits in that a separate power conversion circuitry was required for each of the primary and standby generator buses. The redundancy and dedicated function of these types of power distribution systems are inefficient in that unnecessary redundancy in power conversion circuitry results in loss of power in the conversion circuitries.

Additional problems associated with completely dedicated standby and primary power sourcing for systems employed in computerized user equipment gives rise to power sequencing anomolies. For example, in a known prior art system, a captain's control system was powered by a first bus connected to a primary power generating means to provide non-critical supplies to input output ports of the captain's processor and display system; while a second captain's power supply normally connected to the primary bus, but switchable to the standby emergency power bus, would power the captain's microprocessor. Requirements dictated that in order for the processor to function correctly, the processor had to be powered concurrently with the input/output ports or prior to the input/output ports. Other anomolies arose which were caused by application of primary power without standby power, while still further problems arose due to mutual induction affecting detrimental interaction between colocated power conversion and regulation circuitries utilized to independently supply the captain's non-critical and critical power requirements.

The present invention relates therefore to the provision of a new and improved power distribution system of the type employing a primary power generating means and a battery-driven standby power generating means. The primary power generating means normally powers both the captain's non-critical and critical supplies. Under emergency conditions, the captain's critical supplies are powered from the battery driven standby source. Automatic and selective power reduction as concerns the captain's critical supply requirements under standby emergency conditions is provided.

The present invention is featured in the powering of critical and non-critical supplies, as defined by a user system, from a standby bus connected to a primary power generation means under normal operating conditions and connected to an emergency battery driven standby power generating means under emergency conditions, with attendant automatic powering-down of standby power requirements under emergency conditions, such that only power supplies deemed critical to continued user system functioning are maintained.

Figure 2:
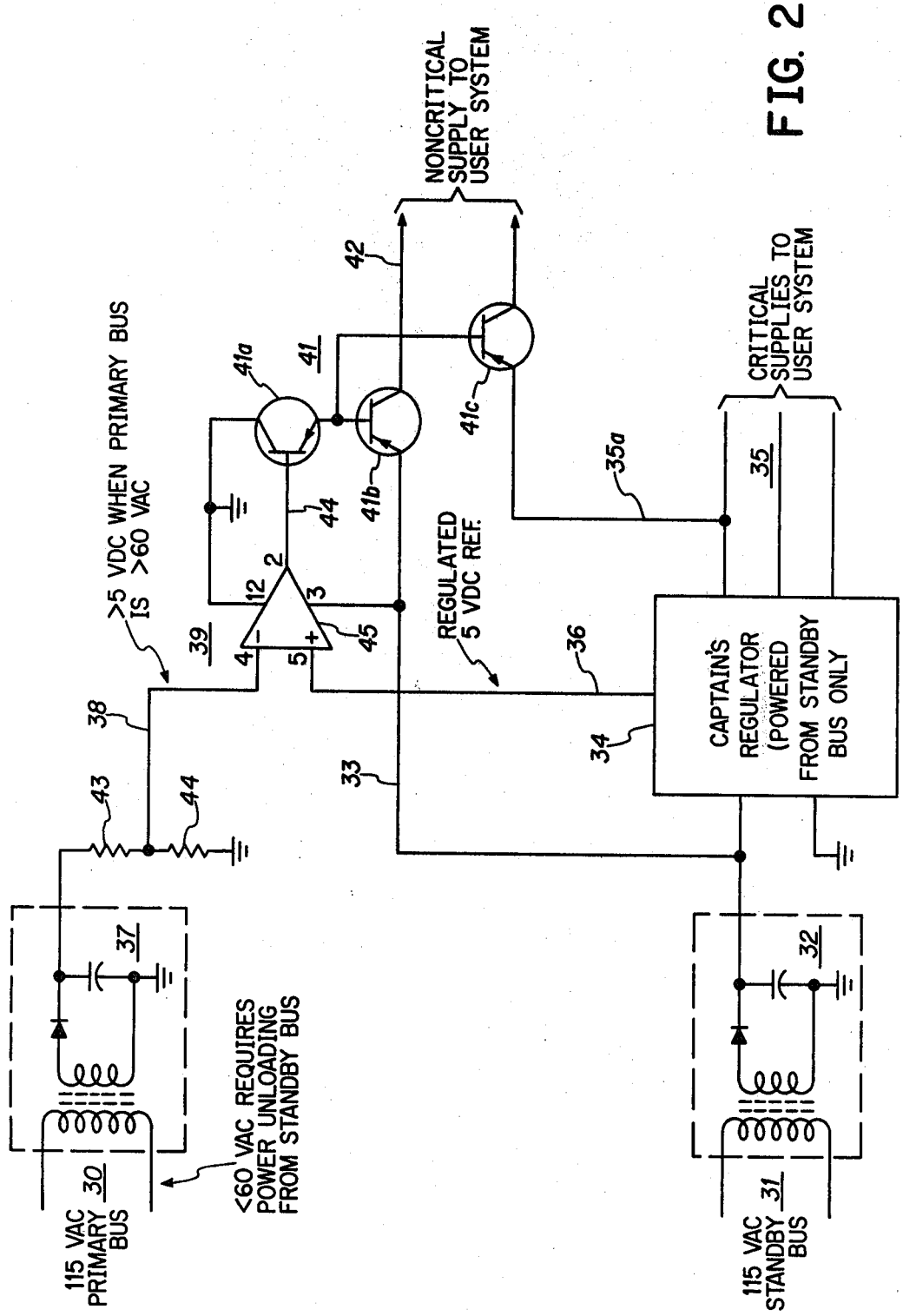

These and other features and objects of the present invention will become apparent upon reading the following description with reference to the accompanying drawings in which:

FIG. 1 is a functional block diagram of a primary and emergency backup power system as utilized to power critical and non-critical supplies for a user system; and FIG. 2 is a functional schematic block diagram of a monitoring system employed to automatically power-down the standby power requirements under emergency operating conditions.

With reference to FIG. 1, the system to be described includes a primary 115 volt power generating source in the upper-left portion of the diagram. An aircraft engine 10, for example, drives a 115 volt primary generator 12 through mechanical linkage 11. The output 13 from generator 12 is supplied to the energizing winding 15 of a relay 14. Relay 14 operates two sets of switching contacts 16 and 17. The output 13 from primary generator 12 is connected via lines 18 and 19 to a primary 115 volt bus 30. In the energized position of relay 14 (assuming normal operation of the primary generator 12), relay 14 connects line 19 of the primary generator output 13 through contacts 21-16 to provide the primary generator output 13 to a standby bus 31. Assuming failure of the primary generator 12, relay 14 is de-energized to disconnect primary generating means output on line 19 from the standby bus 31 and to connect, via contacts 23-16 of relay contact set 16, the output 20 from a 115 volt emergency standby generator 28 to the standby bus. Contacts 24-17 of relay 14 connect a battery 25 through line 26 as an energizing input 27 to the 115 volt emergency standby generator 28. Thus, during normal operation of the upper depicted primary 115 volt generator, both primary bus 30 and standby bus 31 are connected to the output of the primary generator 12, and, upon failure of the primary generator 12, the system of FIG. 1 automatically disconnects the standby bus 31 from the primary generator 12 and connects it to the emergency standby generator 28. The standby bus 31 is applied to a power converter 32 to convert the 115 volt input to a dc output 33 which, in turn, is connected to a voltage regulator 34 to provide outputs 35, defined as critical supplies, to a user system.

The output 33 from power converter 32 in the standby supply is additionally applied through a switching means 41 (when closed) to provide non-critical supply outputs 42 to the user system. As depicted in FIG. 1, a predetermined one or ones of the regulated outputs for voltage regulator 34 supplying critical supplies to the user system may be connected as via line 35a through switching means 41 for application as non-critical supply 42 to the user system.

In accordance with the present invention, switching means 41 disconnects the non-critical supply inputs thereto from the switch output lines 42 to effect a power-down of the user system when operating in the emergency standby mode. Switching means 41 is operated to be closed to pass power from the standby bus applied to the user system supply output lines 42 when, and only when, the primary power generating system is operating normally. During normal operation of the primary power generating means 12, 115 volt ac on the primary bus 30 is applied to a power converting circuitry 37 from which a sample dc voltage is applied on line 38 as a sample input to a level monitoring circuitry 39. Level monitoring circuitry 39 receives a reference input on line 36 from the voltage regulator 34 which is powered by the standby bus. As will be further described, as long as the level of the output voltage from the primary power generating means 12 is above a predetermined level, the sample output 38 from the power converter 37 fed by the primary bus exceeds the reference input 36 from the voltage regulator 34 in the standby supply. This condition, and this condition only, causes an output 40 from the level monitor 39 to be developed in response to which the electronic switching means 41 is energized to pass the power applied thereto to the output lines 42 supplying the user system. Should the level of the output of the primary voltage generating means 12 fall beneath the aforementioned predetermined level, the sample output 38 from power converter 37 falls beneath the reference input to the monitor, whereupon the output from the level monitor 39 causes the electronic switching means 41 to "open" such that power applied thereto is not passed to the output lines 42.

Level monitor 39, powered from the standby bus, thus compares a fixed reference voltage from the standby regulator 34 to a sample voltage 38 derived from the primary bus. As long as the primary bus is above a predetermined level deemed satisfactory for user system operation, the output from the monitor is such as to close the electronic switching means 41 to supply non-critical power to the user system on lines 42.

Thus, as functionally depicted in FIG. 1, loss of the primary power from primary power generating means 12 causes the standby bus 31 to be switched to the emergency standby generator. Loss of primary power causes the sample input 38 to the level monitor 39 to fall beneath the reference input 36 from the standby voltage regulator, whereupon the comparator output opens switching means 41 such that non-critical supplies are not applied to the user system, resulting in a battery-saving power-down of the user system under emergency conditions.

Referring now to FIG. 2, wherein corresponding components are like referenced, the 115 volt primary bus 30 is applied to a power converter 37 which produces a dc voltage output which is applied across voltage divider network 43-44 to provide a sample dc voltage 38 the level of which is a function of the level of the 115 volt ac primary bus voltage. This sample dc signal 38 is applied to the non-inverting input terminal of a voltage comparator 45 which implements the function of level monitor 39.

In the lower portion of FIG. 2, the 115 volt standby bus 31 is applied to a power converter 32 which rectifies the ac signal and develops a dc output signal 33. Output signal 33 is applied to a voltage regulator 34 which develops regulated outputs on lines 35 as well as a reference regulated output 36 for application as the second input to voltage comparator 45. As depicted in FIG. 2, the unregulated dc voltage 33 at the output of power converter 32 is applied as power input to the voltage comparator 45 and is additionally applied to the emitter of NPN transistor 41b whose collector is connected to output line 42. In addition, one of the critical supply outputs 35a from the standby regulator 34 is shown connected to the emitter of a second switching transistor 41c the collector of which is connected to a non-critical power supply line to the user system. The output from the voltage comparator 45, which might comprise a commercially available Fairchild LM139 voltage comparator, is connected to the base of a further NPN transistor 41a whose emitter is connected to the bases of each of the output switching transistors 41b and 41c and whose collector is grounded.

In operation, in a particular implementation, a five-volt regulated reference signal 36 is applied to the voltage comparator 45 and the sample input 38 to the voltage comparator, as defined by the voltage dividing network 43-44 which samples the primary bus level, is greater than 5 volts dc when the primary bus level is greater than a predetermined level of 60 volts. As long as the primary bus 30 is above this predetermined 60 volt ac level, the sample input 38 exceeds 5 volts dc and the output of voltage comparator 45 is essentially at ground potential such that the comparator 45 sinks current. This current sink biases transistor 41a on, which in turn biases switching transistors 41b and 41c on, and provides non-critical power on output lines 42 to the user system. The loss of primary bus voltage, or any component failure which prevents a continuous current flow through transistor 41a, will result in switching transistors 41b and 41c turning themselves off, thus unloading power from the standby bus. With the particular monitoring and switching circuitry depicted and described herein, failures in the circuitry are thus steered toward the power-unloading condition.

The present invention is thus seen to provide a means for automatic power unloading to conserve battery power in an emergency backup situation where a primary power bus fails and an emergency standby power bus is activated. Though the invention has been described in a particular flight control system environment, it is not to be so limited since similar functions requiring power off-loading, or switching of any system powered by multiple sources, or having a discrete input which signals the need to switch or off-load power, could utilize the present invention.

I claim:

1. In a power supply and distribution system for supplying critical and non-critical outputs to a user system:

first primary power generator means and second emergency standby power generating means, first and second power buses, said first power bus connected to the output of said first power generator means, a first switching means connecting the output of said second bus to the output of said first power generator means when said first power generator means is operative, and connecting the output of said second bus to the output of said second power generating means when said first power generating means is inoperative, sensing monitor means comparing a sample input signal proportional in magnitude to the voltage on said first power bus with a reference signal proportional to the level on said second power bus and generating a control signal output when said sample and reference inputs thereto exhibit a predetermined discrepancy therebetween, further switching means through which at least a portion of power supply output lines supplied from said second bus are disconnected from said user system in response to said control signal output from said sensing monitor means, said first bus connected to a first power conversion means to provide said sample input to said sensing monitor means, said second bus connected to a second power conversion means and a power regulator circuitry from which critical power output is supplied said user system and a reference input is supplied to said sensing monitor means, the output of said second power conversion means being connected as a power input to said sensing monitoring means and to said second switching means, and with non-critical power output from said second power conversion means and said power regulator circuitry being connected through said second switching means to said user system.

2. The system as defined in claim 1 wherein said sensing monitor means comprises a voltage comparator receiving said sample and reference voltage as respective inputs thereto, said second switching means comprises switching transistors connected in circuit with the output of said comparator, and with said comparator output rendering said switching transistors conductive when said comparator sample input exceeds the reference input thereto and non-conductive when said sample input is less than the reference input thereto.

3. The system as defined in claim 2 wherein said second switching means comprises a first transistor with base connected to the output of said comparator and collector connected to system ground, and at least one further transistor of the same type as said first transistor with base connected to the emitter of said first transistor, emitter connected to a noncritical supply voltage to be switched and collector connected to said user system.

* * * * *